US007411935B2

(12) United States Patent
Ryan et al.

(10) Patent No.: US 7,411,935 B2
(45) Date of Patent: *Aug. 12, 2008

(54) SELECTING THE DATA RATE OF A WIRELESS NETWORK LINK ACCORDING TO A MEASURE OF ERROR VECTOR MAGNITUDE

(75) Inventors: Philip J. Ryan, Stanmore (AU); Andrew R. Adams, Stanmore (AU); Brian Hart, Wollstonecraft (AU); Jason R. Crawford, McMahons Point (AU); Andrew F. Myles, St. Ives (AU)

(73) Assignee: Cisco Technology, Inc., San Jose, CA (US)

( * ) Notice: Subject to any disclaimer, the term of this patent is extended or adjusted under 35 U.S.C. 154(b) by 458 days.

This patent is subject to a terminal disclaimer.

(21) Appl. No.: 11/099,115

(22) Filed: Apr. 5, 2005

(65) Prior Publication Data

US 2005/0195744 A1 Sep. 8, 2005

Related U.S. Application Data

(63) Continuation of application No. 10/367,010, filed on Feb. 14, 2003, now Pat. No. 6,898,198.

(51) Int. Cl.
*H04Q 7/24* (2006.01)
(52) U.S. Cl. .................. 370/338; 370/252; 370/332
(58) Field of Classification Search .................. None
See application file for complete search history.

(56) References Cited

U.S. PATENT DOCUMENTS

| 5,809,430 | A | 9/1998 | D'Amico .................. 455/525 |
| 5,815,811 | A | 9/1998 | Pinard et al. .............. 455/434 |
| 6,731,947 | B2 | 5/2004 | Hoagland et al. ........... 455/517 |
| 6,760,313 | B1 | 7/2004 | Sindhushayana et al. ..... 370/252 |
| 2002/0072346 | A1 | 6/2002 | Kato et al. ................. 455/403 |
| 2002/0075834 | A1 | 6/2002 | Shah et al. ................. 370/337 |
| 2003/0012302 | A1 | 1/2003 | Webster et al. ............. 375/316 |
| 2004/0100898 | A1 | 5/2004 | Anim-Appiah et al. ...... 370/210 |

OTHER PUBLICATIONS

H. Yutaka, "Wireless LAN Measurement System and Dedicated Software", *Yokogawa Technical Report English Edition*, No. 34, 2002, Yokogawa Electric Corporation, Tokyo, Japan. Available at http://www.yokogawa.com/TR/pdf/English/No34/P21-24.pdf.

"EVM ensures superb performance for Wireless LAN RFIC test", vol. 6, No. 2, autumn 2002, Agilent Technologies, Palo Alto, CA. Available at www.agilent.com/see/gosemiconductor/news.

"High-Speed Measurement of Digital Wireless System SNR by Means of Error Vector Magnitude Analysis", summary of paper presented at Wireless Conference, Boulder, Colorado, 1996. Also available at http://www.coelacanth.com/coel/wireless.html.

"RF Testing of Wireless LAN Modems", Agilent Technologies, Palo Alto, CA. Available at http://www.tmintl.agilent.com/images_agilent/us/WLANbbtest.pdf.

*Primary Examiner*—Wing F. Chan
*Assistant Examiner*—Michael J Moore, Jr.
(74) *Attorney, Agent, or Firm*—Dov Rosenfeld; Inventek

(57) ABSTRACT

An apparatus in a node of a wireless network for setting the data rate for sending data to a remote node, and a method for setting the data rate. The method includes receiving a packet from the remote node, determining a measure of signal quality for the received packet; and selecting the data rate for communicating to the remote node according to at least the determined signal quality. The measure of signal quality is a measure of the EVM of the received packet. One implementation conforms to one or more variants of the IEEE 802.11 standard that uses OFDM packets.

24 Claims, 4 Drawing Sheets

SELECTING THE DATA RATE OF A WIRELESS NETWORK LINK ACCORDING TO A MEASURE OF ERROR VECTOR MAGNITUDE

RELATED APPLICATION(S)

The present invention is a continuation of U.S. patent application Ser. No. 10/367,010 to inventors Ryan et al., filed Feb. 14, 2003, now U.S. Pat. No. 6,898,198, the contents of which are incorporated herein by reference for all purposes.

BACKGROUND

This invention relates to wireless communication, and in particular, to a method and apparatus to select the data rate of a wireless network link according to a measure of error vector magnitude at a receiver.

A wireless network such as a wireless local area network (WLAN), includes a number of nodes each containing a wireless transceiver and modulator/demodulator (a "radio"). A wireless network may conform to one or more standards, e.g., one or more variants of the IEEE 802.11 standard such as IEEE 802.11a, 802.11b, or 802.11g. In an ad-hoc network, called an independent basic service set (IBSS), any nodes acts as station (STA) and communication is from STA to STA, while in an infrastructure network, a radio may be a (client) STA or an access point (AP), and all communication is via the AP.

Many wireless network standards permit a plurality of data link rates, each data rate typically having one or more modulation schemes and coding rates. A radio (AP or STA) needs to select a data link rate from those available, for example in order to optimize traffic throughput in the WLAN. For each of the data rates, the quality of a signal received at a receiver, e.g., the received signal-to-noise ratio or received carrier-to-noise ratio, needs to be above a particular level in order to achieve a "good-enough" level of performance, e.g., a low enough bit error rate or packet error rate. Moreover, the wireless link, i.e., the wireless channel from one radio to another, varies over time. Therefore, in order for the throughput to be optimum at all times, there is a need for radios not only to select the best initial data rate to use, but also to vary the data rate over time as conditions change.

One method for selecting the data rate is to consider the received signal strength indication—the RSSI—of signals received at a receiving radio from another radio. The RSSI, however, is not in itself a good indicator of signal quality. For example, a high RSSI signal in a strong multipath environment, such as in many indoor environments may in fact be signal of relatively low quality, albeit of high signal strength.

Another rate selection method is to iteratively determine the rate by starting with the an initial rate, which may be the highest rate, or may be some middle rate based on history, and retrying until a satisfactory rate is achieved. The iterative method includes the one radio starting transmitting to the other at the highest available rate, and if that initial rate does not lead to a response from the other radio indicating satisfactory reception, retrying at a reduced rate. The retries are repeated until a response is received indicating successful reception at the other radio. A variation that can be used with radios that have configurable transmit antennas, e.g., an array of switched antennas, or smart antennas, retries at the same rate but using a different antenna configuration. The rate is lowered when no antenna configuration provides good enough communication at a given rate. A history of attempts typically is maintained for this purpose.

Yet another method combines the iterative approach with requesting all potential interferers not to transmit. For example, in an IEEE 802.11 conforming network, a request-to-transmit (RTS) packet may be transmitted by the radio. The RTS is sent at the lowest rate and informs all other radios that the RTS-transmitting radio is about to transmit. A radio receiving the RTS does not transmit for a period of time.

Yet another method combines the iterative method and the RSSI-based method.

Any iterative method takes time to achieve the appropriate rate. An iterative method starting with the highest rate may take as many as 24 attempts before deciding to give up. Each additional attempt reduces the throughput in the wireless network.

There thus is a need to provide an improved method for a radio to select the data link rate for transmitting to a remote radio.

SUMMARY

Disclosed herein is a method implemented in a node of a wireless network for selecting the data rate for sending data to a remote node. The method includes receiving a packet from the remote node, determining a measure of signal quality for the received packet; and selecting the data rate for communicating to the remote node. In one version, the data rate for communicating to the remote node is according to at least the determined signal quality. In another version, the measure of signal quality is sent to the remote node so that the remote node can communicate at a data rate dependent on the sent measure.

Also disclosed herein is an apparatus for inclusion in a node of a wireless network. The apparatus includes a receiver to receive data from a remote node. The receiver includes an analog-to-digital converter producing samples of packets of data received at the node from the remote node. The apparatus further includes a demodulator coupled to the receiver to demodulate decision-point-samples of the signals received at the receiver to produce demodulated signals, and an EVM calculator coupled to the receiver to determine a measure of the signal quality of the decision point samples of the received signal. The apparatus further includes a transmitter to transmit data for transmission to the remote node. The transmitter has a settable data rate. The data rate is set according to a data rate signal accepted by the transmitter.

The apparatus includes a data rate setting processor coupled to the EVM calculator to produce the data rate signal for the transmitter. The data rate signal is set so that the data rate for transmission to a particular node is a function of at least a measure of the signal quality produced by the EVM calculator from signals received from the particular remote node.

Embodiments of the method and apparatus are described wherein the measure of signal quality is a measure of the EVM of the received packet. Furthermore, in one embodiment, the wireless network conforms to one or more variants of the IEEE 802.11 standard that use OFDM packets, including proposed amendments such as IEEE 802.11g.

DETAILED DESCRIPTION

Described herein is a method and an apparatus for a radio to set its transmission rate to transmit data to a second radio. The method uses a measure of the Error Vector Magnitude (EVM) on packets received from the second radio to provide an indicator of signal quality. The EVM is used by the radio to select the data rate to use to transmit to the second radio.

The invention will be described in terms of a transceiver that operated according to variants of the IEEE 802.11 standard and proposed amendments that use OFDM, including variants commonly known as 802.11a (approx. 5 GHz UNII band) and 802.11g (approx. 2.4 GHz) that support several data rates up to 54 Mbps. The invention is also applicable to a radio that operated under any other wireless standard, including other variants in the IEEE 802.11 standard.

EVM is a modulation quality metric widely used in digital RF communications systems. It is typically defined for a transmitter or a receiver, and is the root-mean-square (RMS) value of the error vector over time for the signal at the correct symbol time. In the case of a receiver, the correct symbol times are approximated by the decision points—the times when demodulation decisions are made. The error vector is the vector length of the difference, in the complex plane (I,Q space) between an ideal constellation point of a symbol, and the actual constellation point of a symbol at the symbol time for the signal.

Figure 1:
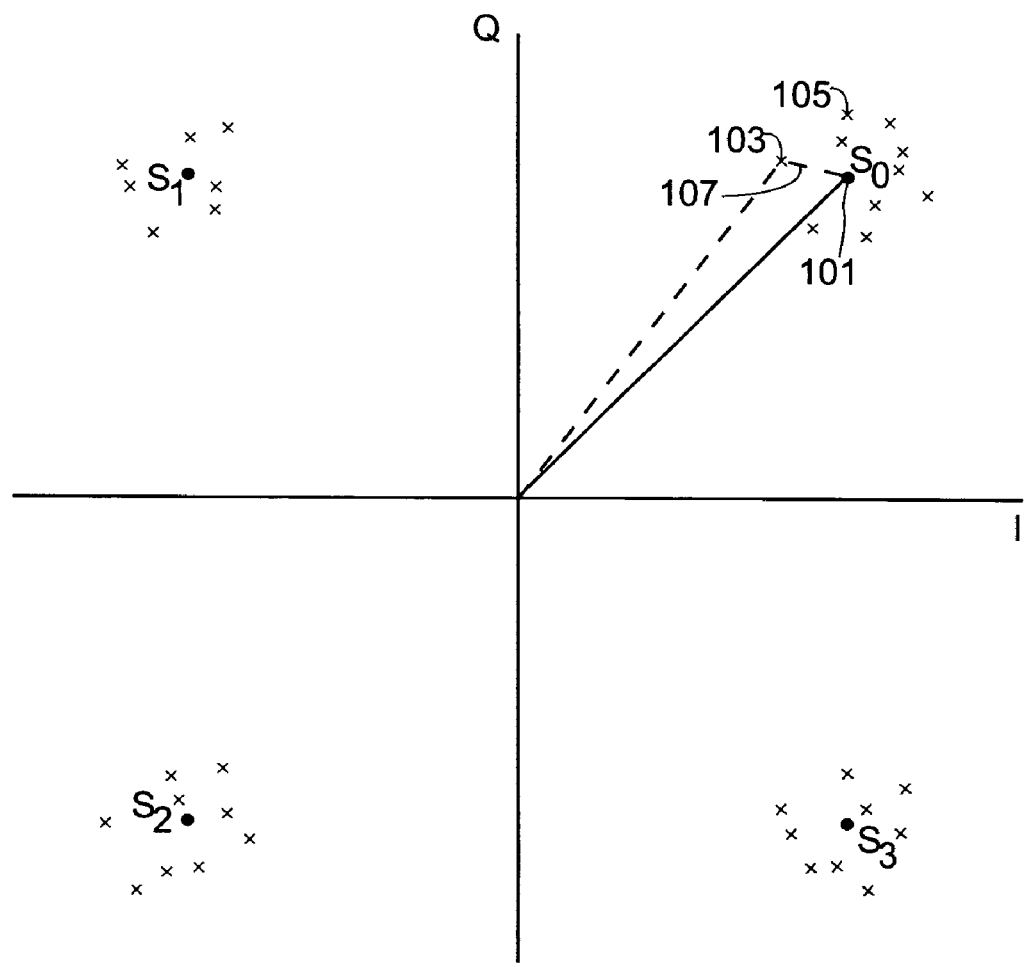
FIG. 1 shows an I,Q plane with a constellation of four possible symbols $S_0$, $S_1$, $S_2$, and $S_3$ for a signal that is modulated by a quartenary phase shift key (QPSK) modulation scheme.

Consider, for example, FIG. 1 that shows the constellation of the four possible symbols $S_0$, $S_1$, $S_2$, and $S_3$ for a signal that is modulated by a quarternary phase shift key (QPSK) modulation scheme. Ideally, each actual symbol at the symbol time falls on one of the four constellation points. In practice, because of phase error and/or magnitude error, the I,Q values for the modulated signal samples fall on points that are not exactly at the four ideal constellation points. FIG. 1 shows many such I,Q values, each indicated by an "X." Two such signal samples are shown as 103 and 105 near the $S_0$ constellation point 101. Consider point 103. The EVM is the mean of the square root of the square of the lengths—e.g., length 107—of the vectors that are the errors between the correct constellation point—e.g., constellation point 101—and the actual signal vector—e.g., vector 103. This quantity is normalized by the signal strength, so is expressed as a percentage (% RMS). Alternatively, it may be expressed in dB. When expressed in dB, the EVM is sometimes referred to as the relative constellation value.

The measurement of EVM is somewhat complicated by carrier leakage that causes the origin of the IQ axes to shift.

One aspect of the invention is to use the EVM as a measure of the quality of the received signal. Used properly, EVM and related measurements can pinpoint exactly the type of degradations present in a signal and can even help identify their sources.

Figure 2:
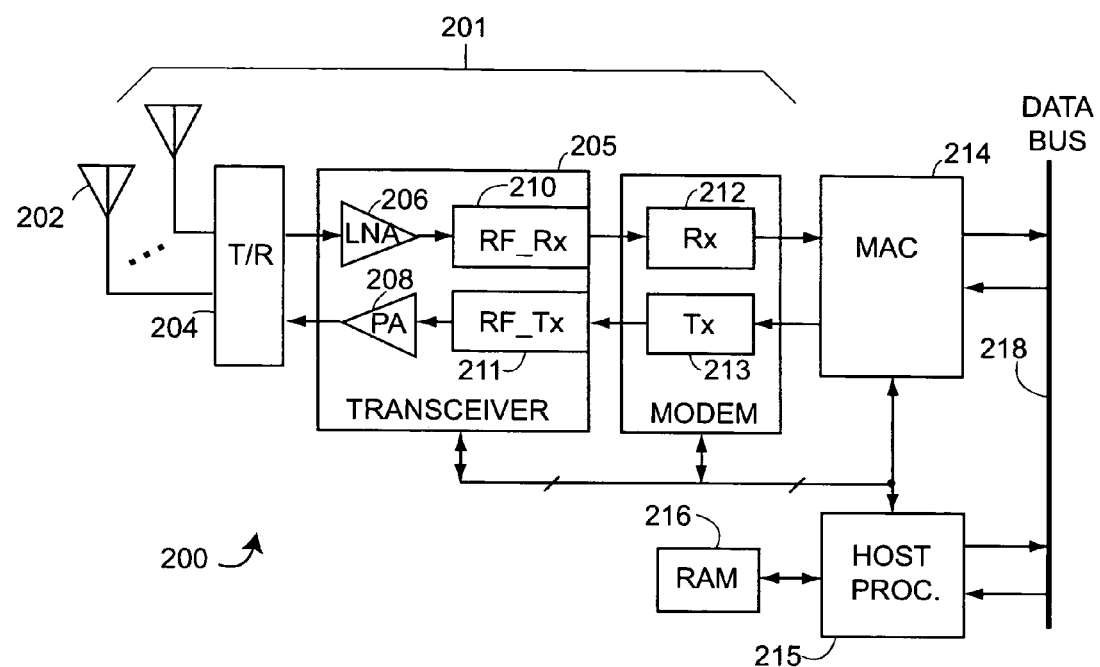
FIG. 2 is a functional block diagram of a wireless network node that includes an embodiment of present invention.

FIG. 2 is a functional block diagram of a wireless network node 200 that includes an embodiment of present invention. The node 200 might be, for example, implemented on a PCMCIA wireless LAN card, and includes a physical layer interface (PHY) 201 that includes at least one antenna 202 for the frequency or frequencies of service (approx. 2 GHz and/or approx. 5 GHz), a transmit/receive (T/R) switch 204 for half-duplex operation, and a wireless transceiver that in the receive chain includes a low-noise amplifier (LNA) 206 and receiver radio frequency (RF) electronics 210. The transmit part of the transceiver includes transmit RF electronics 211 and a power amplifier (PA) 208. The PHY also includes a modem that includes a receiver part 212 and a transmitter part 213. The system 200 further includes a medium access controller (MAC) 214 for layer-2 processing. A computer system databus 218 is accommodated. Interfaces may be included, e.g., one or more interfaces that conform to well-known industry standards PCMCIA, PCI, USB, and so forth.

One optional component is a host processor 215. The host processor function may, for example, be incorporated with the MAC 214. In one embodiment, a random access memory element (RAM) 216 is included for data buffering and program storage. The RAM 216 may be directly coupled to the host or to the MAC or to both.

In addition to the payload data between the modem, radio transceiver, and MAC, control information such as gain settings for the radio receiver from an automatic gain control module in the modem, and other data is communicated between the transceiver and the modem. Furthermore, other data may be communicated between the modem and the MAC, and between the modem and the host (if included). In one embodiment, the modem generates EVM data about a received packet and communicates the EVM data to the MAC. The MAC provides data rate information to the transmitter part of the modem to set the transmitter to transmit at a settable data rate to a particular remote node. According to one aspect of the invention, the data rate information is determined by the EVM of signals received from the particular remote node.

Some embodiments may use antenna diversity, e.g., two or more transmit antennas or two or more receive antennas or multiple antennas for both receiving and transmitting. The diversity may be provided by spatial diversity, or by having different polarizations at the antennas, and so forth. The antennas may be switched or combined. Such processing is known to improve performance in environments that include fading, and may even be used to provide spatial division multiple access (SDMA).

One embodiment of system 200 is compatible with one or more variants of the IEEE-802.11 standards for wireless local area network (LAN) applications. The RF transceiver 210 and modem 212 constitute a complete wireless engine for OSI Layer-1 physical layer (PHY) functionality for one or more of the IEEE-802.11 PHY variants, and the (MAC) 214 is IEEE-802.11-compatible.

One embodiment of the system 200 preferably is constructed on a single printed circuit board (PCB). The RF transceiver 210 and modem 212 are each implemented with CMOS technology in individual integrated circuits (chips).

The OFDM Receiver

One embodiment of the invention is applicable to communicating using OFDM packets that conform to the IEEE 802.11 OFDM variants. Such an OFDM packet starts with a preamble. The preamble provides for start of packet (SOP) detection, automatic gain control (AGC), diversity selection when diversity is used, various other synchronization functions, and channel estimation. The preamble is followed by the modulated payload, which starts with a known (low) data rate SIGNAL field that provides information about the packet, including the data rate at which the rest of the packet in encoded. The SIGNAL field is followed by DATA fields at a rate specified in the SIGNAL field. Each data field includes a guard interval (cyclic extension). The SIGNAL field includes information on the data rate (RATE). The RATE information determines the coding rate and the modulation method used according to the following Table 1:

TABLE 1

Modulation type for IEEE 802.11 OFDM packets

| Rate (Mbps) | Modulation type | Coding rate |
|---|---|---|
| 6 | BPSK | ½ |
| 9 | BPSK | ¾ |
| 12 | QPSK | ½ |
| 18 | QPSK | ¾ |
| 24 | 16-QAM | ½ |
| 36 | 16-QAM | ¾ |
| 48 | 64-QAM | ⅔ |
| 54 | 64-QAM | ¾ |

One embodiment further includes several proprietary modulation additional data rates that do no conform to the IEEE 802.11 standard.

Figure 3:
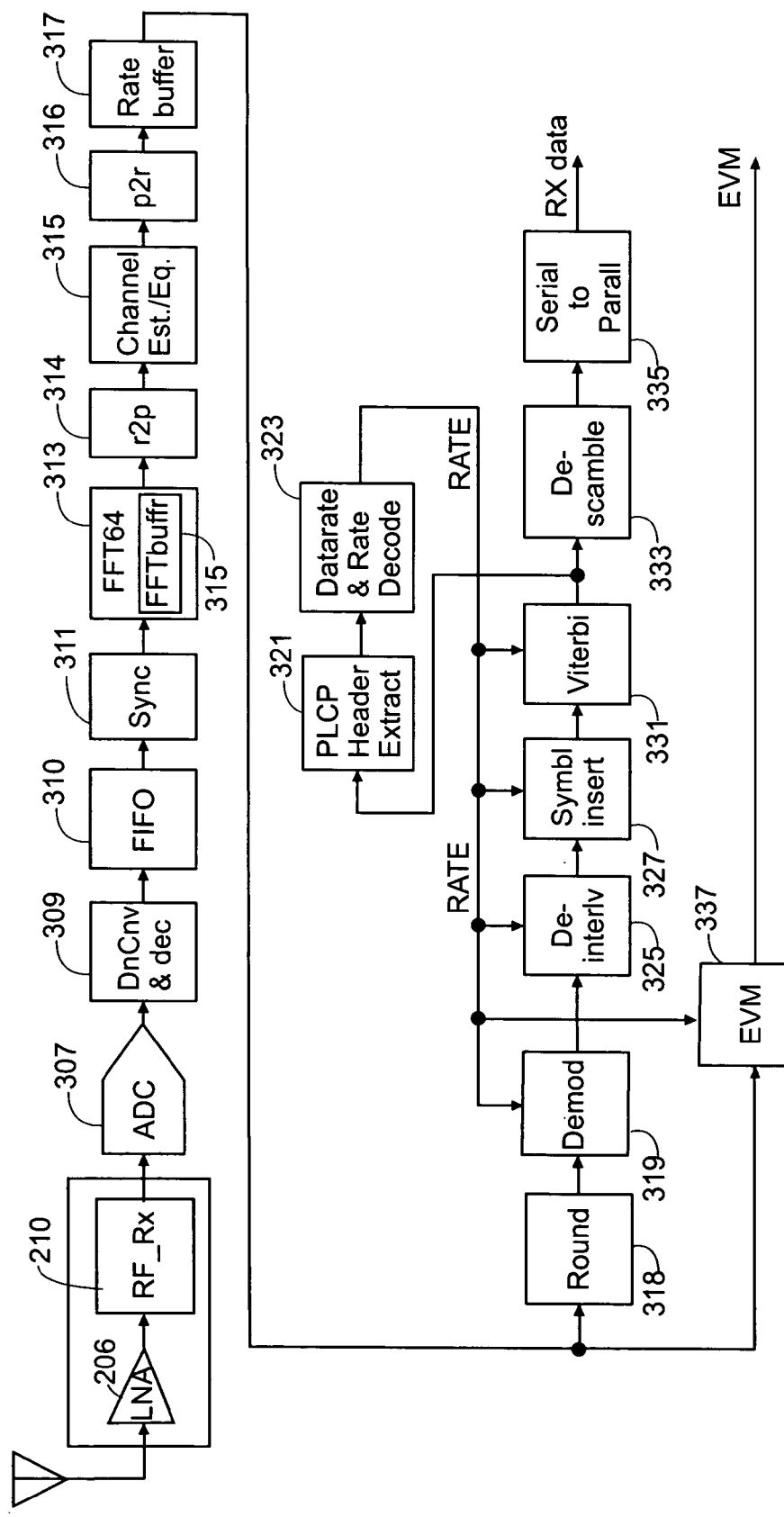
FIG. 3 shows a simplified block diagram of the OFDM receiver part of the modem shown in FIG. 2 according to one embodiment of the present invention.

FIG. 3 shows a simplified block diagram of the OFDM receiver part 212 of the modem. The embodiment shown works with a version of the receive RF electronics 210 that produces an IF signal with a 20 MHz bandwidth requiring further downconversion to obtain baseband I,Q signals. The analog IF signal from the receive RF electronics 210 may be set to be centered at a settable frequency between 20 MHz and 25 MHz, e.g., at 20 MHz. An ADC 307 digitizes the analog received signals. Element 309 further downconverts and decimates the signals to produce I and Q samples that enter a first in first out (FIFO) buffer 310 and a time synchronization unit 311. Synchronization is achieved by one or more methods, such as estimating the short preamble's short symbol timing using a correlator and estimating the guard interval timing of the long preamble. The synchronization unit further includes frequency estimation and frequency correction using a rotator. The output of the rotator is presented to a 64-sample input buffer 315 of a 64-sample discrete Fourier transformer 313 (FFT64) for time-to-frequency conversion.

The Fourier transformer 313 transforms the complex baseband time-domain samples of the OFDM symbols of the received packet into complex-valued frequency domain samples by a DFT operation. The IQ frequency domain samples from Fourier transformer 313, in bit-reversed frequency order, are converted to polar coordinates by a rectangular-to-polar (amplitude/phase) converter 314—a cordic in one embodiment. The result is input into a channel response estimator/equalizer block 315 that estimates the channel response and that equalizes the signals according to the estimated channel response. Also included in estimator/equalizer block 315 are a channel state information detection circuit and a pilot tone correction unit. The corrected signals are converted back to I,Q (rectangular coordinate) form by a second coordinate converter 316. The output is thus a sequence of IQ frequency samples ready for demodulation.

A rate buffer 317 is included between the second coordinate converter 316 and a demodulator 319. The rate buffer 317 is a second FIFO which buffers the received frequency samples from the end of the SIGNAL field for a number clock cycles equal to the latency (in clock cycles) through the later parts of the receiver needed for processing the SIGNAL field, including demodulating and decoding. The rate buffer block 317 is included because the SIGNAL field, which is always transmitted as a 6Mbps rate ½ binary phase shift key (BPSK) signal, determines the modulation type and coding rate of the remainder of the packet, shown as RATE in FIG. 3. This information is then used to set up the demodulator and Viterbi decoder parameters before the remainder of the packet is input into the demodulator chain. Hence, the remainder of the packet needs to be buffered until at least the RATE information has been successfully decoded.

The output samples (I,Q) of the rate buffer are demodulated by the demodulator 319. In one embodiment, the samples are first rounded from 12-bits for each of I and Q to 6 bits for each by a rounder 318. The demodulator 319 demodulates depending on the modulation specified by RATE. The demodulated symbols from demodulator 319 are de-interleaved by interleaver 325 and symbols inserted in symbol inserter 327 to ensure the symbols have the coding rate to match the decoder included in this one embodiment. The output symbols of symbol inserter 327 are input to a Viterbi decoder 331 and descrambled by descrambler 333. The de-interleaving, symbol insertion, and Viterbi decoding depend on the RATE. The series of descrambled symbols are converted to parallel form by serial-to-parallel converter 335 for input to the MAC processor.

Initially, the demodulator, de-interleaver, decoder, etc. are set to process the SIGNAL field. Once the RATE information, including the modulation scheme, is determined, these elements are set to demodulate the data frames of the payload. In this embodiment, the Viterbi decoder 331 is a ½-rate decoder. The symbol inserter 327 is included to insert dummy signals to convert non-½ rate data into data suitable for the Viterbi decoder 331.

The receiver generates the received data of a packet and passes the data to the MAC processor 214. Additional information also is passed on to the MAC layer processor, including information about the packet. In one embodiment, such information includes a measure of the EVM of the SIGNAL part, a measure of the EVM of the data part of the packet, and the RSSI.

The receiver includes an EVM calculator 337 coupled to and accepting input from the rate buffer, i.e., accepting I,Q samples at the decision points. The EVM calculator determines a measure of the EVM of the OFDM symbols in the packet. The EVM determination depends on the ideal constellation points for the particular modulation type. Hence, EVM calculator 307 also accepts RATE information.

The EVM measure determined by the EVM calculator is sent to the MAC layer processor 214, and is used to provide information to the transmitter part of the modem on what rate to use to send data to the node from which the data is being received.

One definition of the EVM of an OFDM packet (or parts of a packet) of length $L_p$ using 52 subcarriers (including pilot tones) is $$EVM_{RMS} = \sqrt{\frac{\sum_{j=1}^{L_p}\left\{\sum_{k=1}^{52}[(I(j,k)-I_0(j,k))^2 + (Q(j,k)-Q_0(j,k))^2]\right\}}{52 L_p \times P_0}}$$

where $I_0(j,k)$ and $Q_0(j,k)$ denote I,Q for an ideal symbol point of the j'th OFDM symbol of the packet, and k'th subcarrier of the symbol in the complex I,Q plane, $I(j,k)$ and $Q(j,k)$ denote the received I,Q values of the j'th OFDM symbol of the packet, and k'th subcarrier of the symbol in the complex I,Q plane, and $P_0$ denotes the average power of the constellation.

The EVM calculator 337 is used to calculates a measure of the EVM, e.g., a function of the calculated EVM, $EVM_{calc}$ according to the following formula:

$$f(EVM_{calc}) = \frac{\sum_{j=1}^{L_p} \left\{ \sum_{k=1}^{48} [(I(j,k) - I_n(j,k))^2 + (Q(j,k) - Q_n(j,k))^2] \right\}}{48 L_p \times P_0}$$

where there are 48 subcarriers—the 52 subcarriers but without the pilot tones, f( ) is the function of the EVM determined and $I_n(j,k)$ and $Q_n(j,k)$ denote the I,Q values of the nearest for an ideal symbol point to the actual I,Q values of the j'th OFDM symbol of the packet, and k'th subcarrier of the symbol in the complex I,Q plane. In one embodiment, the numerator and denominator of $f(EVM_{calc})$ as defined above are determined by the EVM calculator 337 and passed to the MAC processor for determination of $f(EVM_{calc})$, the measure of the EVM. In one embodiment, $f(EVM_{calc})$ is the square of $EVM_{calc}$, the calculated EVM. The EVM calculator 337 determines the nearest neighbor decision point using a hard demodulator. Because of use of the hard decoder, using this measure of the EVM may lead to errors, e.g., having a higher signal quality than the actual signal quality. Such errors are especially possible when the actual EVM is large, e.g., at high data rates when the quality of the signal is relatively low. Determining the EVM according to the Euclidean distance in the I,Q plane to the nearest ideal constellation point is however less complex than determining the distance to the correct ideal constellation point.

Figure 4:
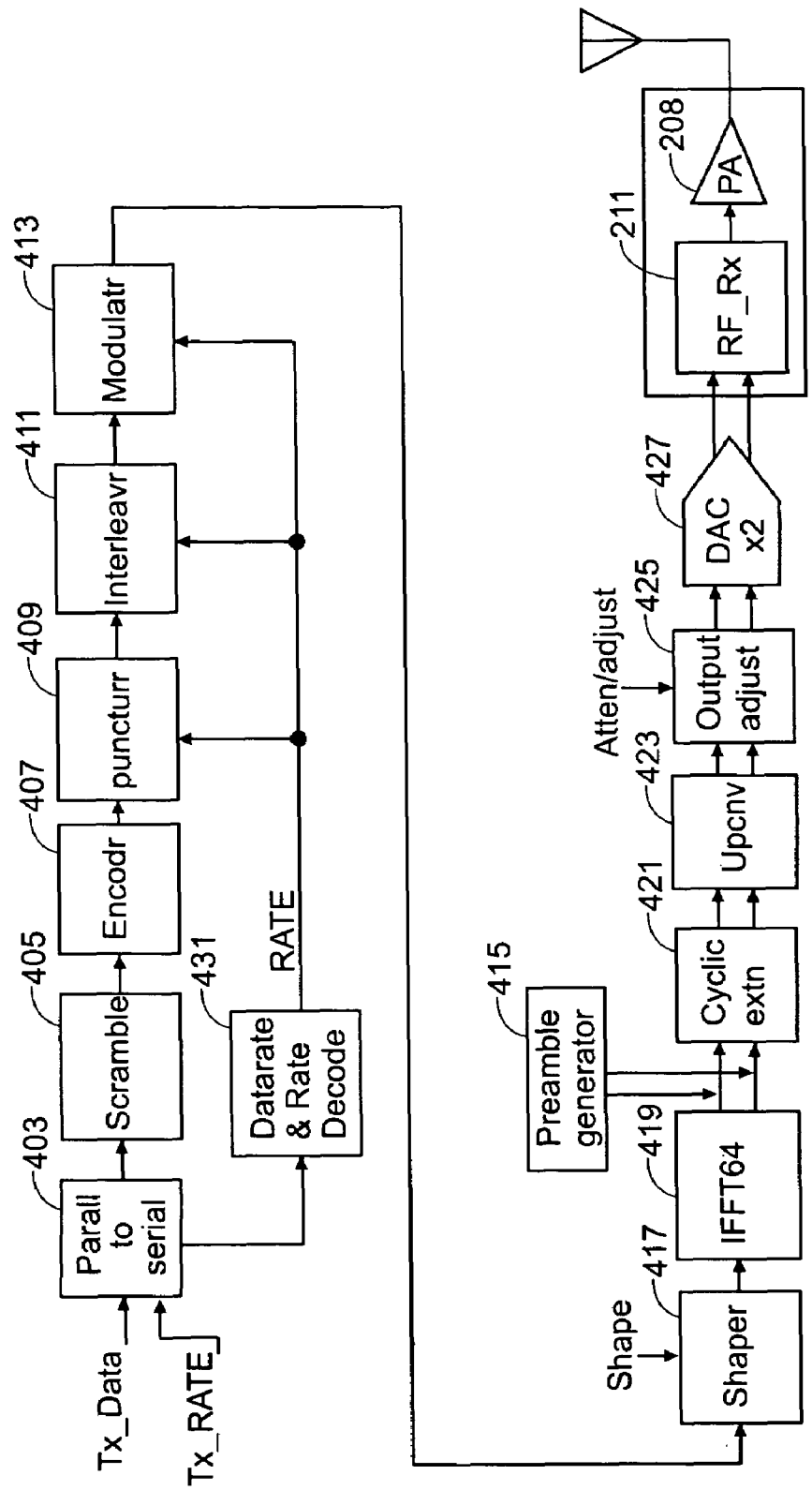
FIG. 4 shows an embodiment of the OFDM section of the transmitter part of the modem shown in FIG. 2 according to one embodiment of the present invention.

In an improved embodiment, the EVM calculator is also coupled to the demodulator and determined a measure closer to the true EVM than the nearest neighbor embodiment. Once the signal is demodulated, the ideal I,Q values for the demodulated signal, e.g., of a reference signal modulated by the decision points, are determined and the measure of EVM determined by EVM calculator 337 is according to the Euclidean distance in the I,Q plane to the ideal constellation point according to the demodulation. In particular, the improved embodiment EVM calculator determines $$f(EVM_{calc\_improved}) = \frac{\sum_{j=1}^{L_p} \left\{ \sum_{k=1}^{48} [(I(j,k) - I_0(j,k))^2 + (Q(j,k) - Q_0(j,k))^2] \right\}}{48 L_p \times P_0}$$

where again there are 48 subcarriers—the 52 subcarriers but without the pilot tones, $f(EVM_{calc\_improved})$ is the function of the calculated EVM according to the improved method, and $I_0(j,k)$ and $Q_0(j,k)$ denote the I,Q values of the ideal symbol point. FIG. 4 shows an embodiment of the OFDM section of the transmitter part 213 of the modem. The OFDM section accepts data for transmission (TX_Data) and additional information from the MAC layer processor. One such item of additional information is the transmission rate (Tx_RATE) that indicates what data rate to use for transmitting the data. The information is provided in parallel to a parallel-to-serial converter 403. Initially the data for SIGNAL is generated, and later, the rest of the packet is generated. Such data is scrambled by scrambler 405, then encoded by convolutional encoder 407 and punctured by puncturer 409. The data is interleaved by interleaver 411 and then modulated by modulator 413. The puncturing, interleaving, and modulating each depend on the RATE, so that elements 409, 411, and 413 accept RATE information from a modulation and code rate decoder 431 that obtains rate information from the parallel-to-serial converter. Following modulation, any required pilot tones are inserted (not shown) and the resulting data is shaped by shaper 417. An inverse DFT carried out by IFFT unit 419 converts the shaped data to complex-valued (I and Q) subcarrier data. Initially, a preamble generator generates the subcarrier data of the preamble of a packet. The subcarrier data for the remainder of the packet is generated by the inverse FFT unit 419. A cyclic extension unit repeats the subcarrier data to add the guard interval. The resulting data is upconverted as necessary according to the particular analog information to be generated. In one embodiment, the analog information is I,Q data at baseband, while a different embodiment generated IF data, e.g., centered at 20 MHz or 25 MHz. The analog information is scaled as necessary according to attenuation/scaling information by scaler 425, and then converted to analog data by digital to analog conversion (DAC) unit 427. The analog data is input to the transmit electronics unit 211. Also provided to the transmit electronics unit are gain settings for variable gain amplifiers that are in the transceiver.

Operation of the Embodiments

A measure of the EVM is calculated by EVM calculator 337 and passed on to the MAC. In one embodiment, the measure is passed to the MAC as a numerator and denominator. In one embodiment, the EVM measure for the SIGNAL part and the EVM measure for the data part of each arriving packet are separately communicated to the MAC processor. In one embodiment, the MAC processor retrieves information contained in each received packet identifying the particular node the packet is from and maintains two metrics for each remote node in communication with the remote node. The two metrics maintained at the MAC are the EVM measure of the last packet from the remote node, and a running average of the EVM measures over a number, say the last N packets from that remote node. For example, in the case of an access point (AP), the MAC maintains two metrics for each associated station (STA). In one embodiment, the MAC processor also maintains the metrics on a set of presently unassociated but previously associated stations.

Selecting the Initial Rate

In one embodiment, when a node receives a packet from a remote node, the latest EVM from the remote node is used to select the initial rate for communicating with that remote node.

The MAC processor includes a memory that stores a table of data rates and the EVM range for such a data rate. In one embodiment, the following Table 2 describes the relationship between the EVM and the data rate:

TABLE 2

Minimum EVM for each Rate

| Rate (Mbps) | Received min. EVM (dB) | Received EVM (% RMS) | TX reqd. min. EVM (dB) | TX reqd. min. EVM (% RMS) |
| --- | --- | --- | --- | --- |
| 6 | −6 | 50.1 | −5 | 56.2 |
| 9 | −6.5 | 47.3 | −8 | 39.8 |
| 12 | −7.5 | 42.2 | −10 | 31.6 |
| 18 | −9 | 35.5 | −13 | 22.4 |
| 24 | −11.5 | 26.6 | −16 | 15.8 |
| 36 | −14.5 | 18.8 | −19 | 11.2 |
| 48 | −19 | 11.2 | −22 | 7.9 |
| 54 | −20.5 | 9.4 | −25 | 5.6 |

The first column in Table 2 is the rate, and the second and third columns provide the maximum EVM (or min. when in dB) for a packet received from a remote transmitter in order to transmit at the rate in the first column. The first three columns of Table 2 describe the signal quality intended to guarantee a packet error rate (PER) of less than 0.05 (<5%) for packets of length 1000 bytes. For completeness, the fourth and fifth columns of Table 2 provide the EVM performance a transmitter needs to meet to satisfy the 5 GHz OFDM variants of the IEEE 802.11 standard known as 802.11a. Thus, the EVM needs to be at most 11.2% RMS (col. 5 of Table 2) for a transmitter to transmit at 36 Mbps. According to one embodiment, a node receiving a packet from a particular remote node with EVM between 11.2% and 18.8% RMS selects a data rate of 36 Mbps for transmitting a response to the remote node.

In the case that the remote node successfully receives the response transmitted at the initial selected rate, communication continues at that rate. In the case that the remote node does not successfully receive the response, the initial rate is lowered until communication is successful.

Compared to the prior art method of iterating starting at the highest rate, fewer iterations should be needed before either successful communication is achieved, or it is ascertained that no communication is possible.

Maintaining An Appropriate Data Rate

Once communication commences, the MAC stores the most recent EVM measure and the average EVM measure over the last number, e.g., the last N packets for the remote node. This most recent packet's EVM measure for a remote node is used to determine if the data rate should be lowered for the next packet sent to that remote node. The average EVM measure is used to determine if the rate for a particular remote node can be increased.

In an improved embodiment applicable, for example, to an AP, a table or other data structure is maintained with the short term and long term EVM measures for each associated STA, and a data rate to use for transmission to that STA. The MAC sets this rate according to the EVM measure.

Thus has been described a method and an apparatus capable of maintaining the optimum data rate across a wireless link. The EVM is measured for each packet, and as the channel changes, the EVM would change, and some changes may lead to a new data rate selected. Compared to prior art methods, we believe embodiments of the invention can provide for fewer packet retries as a node searches for a reliable link data rate, and hence improves throughput.

Alternate Embodiments

Data Rate Selection According To A Plurality of Metrics

In another embodiment, the rate is set according to a measure of the EVM and also from one or more other metrics available to the MAC. In one embodiment, one such metric is the packet error rate (PER) for packets from the remote node. For example, if the EVM from a remote node indicates a high signal quality, but the PER for packets for packets received is high, e.g., indicating a poor receiver, the MAC selects a lower rate than that indicated only by the EVM.

In another embodiment, one of the other metrics used is the signal-to-noise ratio (SNR) at the PHY. In yet another embodiment, one other metrics used is the bit-error-rate (BER) at the receiver.

In one embodiment, the EVM (possibly in combination with one or more other metric) is used not only to select the data rate for transmitting to a remote node, but also to requests the remote node to send packets at a rate determined according to the EVM of signals received from that node.

In one embodiment, both the EVM and the RSSI of signals received from the remote node are passed to the MAC and examined. If the EVM indicates a low signal quality, but the RSSI indicates high signal power, the local node can decide that this particular remote node transmits signals of low quality, even though the link may be good. The local node can then direct the remote node to transmit at a lower data rate. Similarly, if the EVM and RSSI indicate both high received signal quality and high received signal strength, but the data rate at which the remote node is transmitting is relatively low, the local node can inform the remote node that it may transmit at a higher data rate. The remote node then decides whether or not to transmit at a higher data rate, depending, for example, on its capabilities.

Dynamic Data Rate Selection

While in the embodiment described above, the data rate for communicating with a particular remote node is selected according to a fixed rate table that is built based on achieving a fixed PER (of 5%), an alternate embodiment selects the data rate using a more sophisticated data rate selection method that maximizes a measure of throughput based on the traffic. Consider, for example, the AP of an infrastructure network (e.g., a BSS). The AP maintains a record of the PER for each STA. The PER is an indication of the probability of error. For a given traffic mix, as indicated by the distribution of packet lengths for a particular configuration of STAs, the data rate is selected as follows. If the probability of packet error—e.g., as indicated by the measured PER—is very low, then the highest data rate is selected. The throughput at this highest data rate may be calculated based on the statistics for all STAs in communication with the AP. As the packet error rate increases, some packets have to be re-sent, so the throughput starts to be impacted. At first, the occasional re-send of a packet does not significantly affect throughput. As the PER increases, the retry rate increases, and moreover some packets have to be resent more than once, i.e., some of the retries have to be retried, so the effective throughput seen by the user drops. The AP dynamically determines the point at which it is better to reduce the data rate, which also reduces PER such that the throughput is improved. Thus, the data rate is a function not only of the EVM from a particular remote node, but also of the EVMs and PER from all remote STAs in communication with the local node, e.g., the AP.

Sending Signal Quality Information To the Remote Node

It may be that the link between a node and a remote node is not perfectly symmetrical, such that a measure of the signal quality of packets received from a remote node is not sufficient to maintain the optimal data rate at all times. For example, the receivers or transmitters at each end of the link may be different, e.g., have substantially different specification and capabilities. In one embodiment of the invention, a measure of the received signal quality, e.g., a measure of the EVM of the last received packet is sent to the remote node to indicate to the remote node the quality of its transmissions to the local node. In one embodiment, the standard is modified to form a modified standard that provides for sending such information with each packet. Thus according to the modified standard, each packet received from a remote node that conforms to the modified standard includes a measure of the EVM of the last packet received from the local node to that remote node. Such a packet is interpreted by the MAC at the local node. Furthermore, according to the modified standard, the MAC at the local node sets the data rate to the remote node according to that indication of the EVM received at that remote node from the local node. The MAC at the local node furthermore includes information in each packet sent to that remote node that that indicates a measure of the EVM of the last packet received from the remote node.

Thus, in an improved embodiment, a local node that conforms to the modified standard receives a packet from a remote node. A measure of the EVM from that remote node is determined at the EVM calculator 337, and the EVM—in one embodiment as a numerator and denominator—is passed to the MAC processor together with the packet. The MAC processor ascertains if the remote node conforms to the modified standard by examining if information is included on the EVM of the last packet from the local node received at the remote node. If such remotely received signal quality information is included in the received packet, or, in one embodiment, if such remotely received signal quality information is locally stored about the remote node, the local node selects the data rate according to the measure of the EVM of the remotely received last packet. If no such remotely received signal quality information is included in the packet or available, the local node selects a data rate according to the locally received EVM measure.

In one implementation, each packet conforming to the modified standard to be sent to the particular node includes bytes containing the measure of the EVM of the last packet from that remote node as well as the RSSI for that received packet. In yet another embodiment, each packet conforming to the modified standard to be sent to the particular node further includes a byte indicating the power being used to transmit the packet. A local node conforming to the modified standard can use the information sent by a remote node that also conforms to the modified standard in order to set the data rate for communicating with the remote node.

Thus, a method and apparatus has been described that selects the data rate for communicating to a remote node of a wireless network to a node according to a measure of the EVM of signals received from the remote node.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard that use OFDM packets, the invention is not limited to such contexts and may be utilized in various wireless network applications and systems, for example in a system that uses packets other than OFDM packets, e.g., the IEEE 802.11b standard, or in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, bluetooth, GSM, PHS, CDMA, and other cellular wireless telephony standards.

While one embodiment of the OFDM receiver (FIG. 3) accepts an IF signal that requires further downconversion to obtain baseband I,Q signals, in another embodiment, the analog portion provides baseband I,Q signals that require no further downconversion.

While one embodiment of the node (FIG. 2) is for half-duplex operation, and includes a transmit/receive switch 204, other embodiments are for full duplex operation.

The phrase "an EVM calculator that determines a measure of the EVM" and similar phrases include the case of EVM calculator 337 described above that determines in hardware the numerator of an expression a function of the calculated EVM and passes the numerator and denominator to the MAC processor so that no division is carried out by the EVM calculator 337 itself.

While the embodiments above use an EVM calculator that determines a measure of the EVM that is proportional to the square of the calculated EVM, other embodiments may use other measures of the EVM. All such other measures of the EVM, so long as they are monotonic functions of an approximation of the EVM, are within the scope of the invention.

While embodiments above use an EVM calculator that excludes the pilot tones, other embodiments may use a measure of the EVM that includes the pilot tones.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. An apparatus for inclusion in a node of a wireless network, the apparatus comprising:

an OFDM receiver arranged to receive packets of data from a remote node, including an analog-to-digital converter producing samples of signals received at the node from the remote node, said received signals in the form of packets of data, a packet of data including a part modulated in a pre-defined way and containing information indicative of the data rate used for at least some of the packet;

an OFDM demodulator coupled to the receiver arranged to demodulate samples of the signals received at the OFDM receiver to produce demodulated signals, the samples at decision points; and an error vector magnitude calculator coupled to the receiver and to the OFDM demodulator, arranged to accept an indication of the rate as a result of the demodulator demodulating the part modulated in a pre-defined way, the error vector magnitude calculator further arranged to determine a measure of the signal quality of the decision point samples of the received signal, such that the measure of the signal quality determined by the error vector magnitude calculator is used to select a data rate for communicating between the node and the remote node, wherein the wireless network is configured to use OFDM.

2. An apparatus as recited in claim 1, further comprising:
an OFDM transmitter arranged to transmit data for transmission to the remote node, the transmitter having a settable data rate, the data rate set according to a data rate signal accepted by the transmitter; and
a data rate setting processor coupled to the error vector magnitude calculator and to the OFDM transmitter and arranged to produce the data rate signal for the OFDM transmitter, the data rate signal set such that the data rate for transmission to a particular remote node is dependent on the measure of the signal quality produced by the error vector magnitude calculator from signals received from the particular remote node.

3. An apparatus as recited in claim 1, further comprising:
an OFDM transmitter arranged to transmit data for transmission to the remote node,
wherein a packet for transmission from the node to a particular remote node by the transmitter includes a measure of the signal quality produced by the error vector magnitude calculator from signals received from the particular remote node.

4. An apparatus as recited in claim 3, wherein the OFDM transmitter has a settable data rate, the data rate set according to a data rate signal accepted by the OFDM transmitter, the apparatus further comprising:
a data rate setting processor coupled to the error vector magnitude calculator, to the output of the demodulator, and to the transmitter and arranged to produce the data rate signal for the transmitter, the data rate signal set such the data rate for transmission to a particular remote node is dependent on one of the measure of the signal quality produced by the error vector magnitude calculator from signals received from the particular remote node or data received from the particular remote node indicating the signal quality of one or more signals received at the particular node from the node.

5. An apparatus as recited in claim 2, wherein the measure of signal quality is a measure of the error vector magnitude of the received packet.

6. An apparatus as recited in claim 5, wherein the data rate processor is part of a MAC layer processor for the node.

7. An apparatus as recited in claim 1, wherein the wireless network substantially conforms to one of the OFDM variants of the IEEE 802.11 standards.

8. An apparatus as recited in claim 1, wherein the packets of data are OFDM packets, and wherein the demodulator is coupled to the receiver via a discrete Fourier transformer that produces modulated subcarrier signals of packets received from the remote node, such that the demodulation is of the modulated subcarrier signals.

9. A method of setting a data rate for a node of a wireless network that uses OFDM for communication, the data rate being for sending data to a remote node, the method comprising:
receiving an OFDM packet from the remote node, a received OFDM packet including a part modulated in a pre-defined way and containing information indicative of the data rate used for at least some of the packet;
demodulating the part modulated in the pre-defined way to determine the information indicative of the data rate, and further demodulating the at least some of the packet; and
determining a measure of an error vector magnitude (EYM) for the received OFDM packet, the determining using at least the demodulated part that was modulated in the pre-defined way,
such that the determined measure of the EVM is used to select a data rate for communicating between the node and the remote node.

10. A method as recited in claim 9, further comprising:
selecting the data rate for communicating to the remote node according to at least the determined measure of the error vector magnitude.

11. A method as recited in claim 9, further comprising:
including in an OFDM packet for transmission to the remote node an indication of the determined measure of the error vector magnitude of the OFDM packet received from the remote node,
such that the remote node is provided with a measure of the EVM for an OFDM packet received at the node.

12. A method as recited in claim 11,
ascertaining if a packet has been received from the remote node indicating a measure of the signal quality of a packet remotely received at the remote node from the node,
if it is ascertained that such a packet has been received from the remote node, selecting the data rate for communicating to the remote node according to at least the measure of the EVM of the remotely received packet.

13. A method as recited in claim 12,
wherein the ascertaining includes ascertaining if a packet from the remote node conforms to a modification of one of the OFDM variants of the IEEE 802.11 standard or a derivative thereof, the modification being the inclusion in packets of the indication of a measure of the EVM.

14. A method as recited in claim 12, further comprising:
if the ascertaining ascertains that no packet has been received from the remote node indicating the measure of the signal quality, selecting the data rate for communicating to the remote node according to at least the determined measure of the error vector magnitude of the received packet.

15. A method as recited in claim 12, further comprising
setting the data rate such the data rate for transmission to a particular remote node is dependent on one of the measure of the EVM determined from signals received from the particular remote node or data received from the particular remote node indicating the measure of the EVM of one or more signals received at the particular node from the node.

16. A method as recited in claim 9, wherein the wireless network conforms to one of the OFDM variants of the IEEE 802.11 standard or a derivative thereof.

17. A method as recited in claim 9, further comprising requesting the remote node to send packets at a data rate depending on the determined measure of the error vector magnitude.

18. A method as recited in claim 10, wherein the selecting the data rate for communicating to the remote node is according to the determined measure of the EVM and at least one other metric.

19. A method as recited in claim 18, wherein the at least one other metric includes the packet error rate (PER) for packets from the remote node.

20. A method as recited in claim 10, wherein the selecting the data rate for communicating to the remote node is dynamic depending on one or more metrics concerning all the remote nodes in communication with the node.

21. An apparatus for setting the data rate for a node of a wireless network, the data rate for sending data to a remote node, the apparatus included in the node and comprising:

means for receiving a packet from the remote node, a received OFDM packet including a part modulated in a pre-defined way and containing information indicative of the data rate used for at least some of the packet;

means for demodulating, including demodulating the part modulated in the pre-defined way to determine the information indicative of the data rate; and means for determining a measure of an error vector magnitude (EVM) for the received packet, the means for determining the measure of the EVM coupled to the means for demodulating and using at least the demodulated part that was modulated in the pre-defined way, such that the determined measure of the EVM is used to select a data rate for communicating between the node and the remote node.

22. An apparatus as recited in claim 21, further comprising means for selecting the data rate for communicating to the remote node according to the determined measure of the EVM.

23. An apparatus as recited in claim 21, wherein the network conforms to one of the IEEE 802.11 standards.

24. An apparatus for inclusion in a node of a wireless network, the apparatus comprising:

a receiver to receive data from a remote node, including an analog-to-digital converter producing samples of packets of data received at the node from the remote node, a packet of data including a part modulated in a pre-defined way and containing information indicative of the data rate used for at least some of the packet;

a demodulator coupled to the receiver to demodulate samples of the signals received at the receiver to produce demodulated signals, the samples at decision points;

an error vector magnitude calculator coupled to the receiver and to the demodulator, the error vector magnitude calculator arranged to accept an indication of the rate as a result of the demodulator demodulating the part modulated in a pre-defined way, the error vector magnitude calculator arranged to determine a measure of the signal quality of the decision point samples of the received signal;

a transmitter to transmit data for transmission to the remote node, the transmitter having a settable data rate, the data rate set according to a data rate signal accepted by the transmitter; and a data rate setting processor coupled to the error vector magnitude calculator and to the transmitter and producing the data rate signal for the transmitter, the data rate signal set such that the data rate for transmission to a particular node is dependent on the measure of the signal quality produced by the error vector magnitude calculator from signals received from the particular remote node.

\* \* \* \* \*

UNITED STATES PATENT AND TRADEMARK OFFICE
CERTIFICATE OF CORRECTION

| | | |
|---|---|---|
| PATENT NO. | : 7,411,935 B2 | Page 1 of 1 |
| APPLICATION NO. | : 11/099115 | |
| DATED | : August 12, 2008 | |
| INVENTOR(S) | : Ryan et al. | |

It is certified that error appears in the above-identified patent and that said Letters Patent is hereby corrected as shown below:

In column 5, line 19, kindly change "do no conform" to --do not conform--

In column 14, line 2, claim 9, kindly change "EYM" to --EVM--

Signed and Sealed this

Seventh Day of October, 2008

JON W. DUDAS
*Director of the United States Patent and Trademark Office*